(12) United States Patent
D-Antuono

(10) Patent No.: US 10,967,442 B2
(45) Date of Patent: Apr. 6, 2021

(54) TOOL HEAD

(71) Applicant: Milwaukee Electric Tool Corporation, Brookfield, WI (US)

(72) Inventor: Marc D-Antuono, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 187 days.

(21) Appl. No.: 15/615,578

(22) Filed: Jun. 6, 2017

(65) Prior Publication Data

US 2017/0355027 A1 Dec. 14, 2017

Related U.S. Application Data

(60) Provisional application No. 62/347,578, filed on Jun. 8, 2016.

(51) Int. Cl.
| | |
|---|---|
| *B23D 15/04* | (2006.01) |
| *B23D 29/00* | (2006.01) |
| *B25B 27/10* | (2006.01) |
| *B23D 35/00* | (2006.01) |
| *B23P 11/00* | (2006.01) |
| *B23D 15/14* | (2006.01) |

(52) U.S. Cl.
CPC ........... *B23D 15/04* (2013.01); *B23D 35/002* (2013.01); *B23P 11/005* (2013.01); *B25B 27/10* (2013.01); *B23D 15/14* (2013.01); *B23D 29/00* (2013.01)

(58) Field of Classification Search
CPC ............................. B23D 29/02; B23D 29/023
See application file for complete search history.

(56) References Cited

U.S. PATENT DOCUMENTS

| | | | | |
|---|---|---|---|---|
| 70,750 | A * | 11/1867 | Sargent | F16B 45/02 24/599.4 |
| 443,630 | A * | 12/1890 | Adams | F16B 45/02 24/599.5 |
| 445,663 | A * | 2/1891 | Stiles | A22B 5/06 452/187 |
| 527,286 | A * | 10/1894 | Perkins et al. | F16B 45/02 24/600.1 |
| 768,069 | A * | 8/1904 | O'Brien | B60C 27/08 24/598.9 |
| 778,776 | A * | 12/1904 | Eberle | F16B 45/02 24/598.2 |

(Continued)

*Primary Examiner* — Kenneth E Peterson
(74) *Attorney, Agent, or Firm* — Quarles & Brady LLP

(57) ABSTRACT

A tool head includes a first frame having a first arm and a second arm extending from a base to a distal end. The tool head may also include a first blade in the frame between the first arm and the second arm. The first blade is movable from the base toward the distal end. The tool head further includes a second frame hingedly coupled to the first arm. The second frame may include a second blade. The second frame is configured to rotate between a closed-frame position and an open-frame position. The tool head further includes a trip lever hingedly coupled to the first arm and configured to rotate between an open-lever position and a closed-lever position. The trip lever is in the open-lever position when the second frame is in the closed-frame position and the trip lever is in the closed-lever position when the second frame is in the open-frame position.

11 Claims, 9 Drawing Sheets

(56) References Cited

U.S. PATENT DOCUMENTS

| | | | |
|---|---|---|---|
| 1,520,576 A * | 12/1924 | Keaton ............... B66C 1/36 24/600.1 |
| 2,705,357 A * | 4/1955 | Davick ............... B66C 1/36 24/600.1 |
| 2,722,859 A * | 11/1955 | Stoltz ............. H01R 43/0427 72/409.01 |
| 4,342,216 A * | 8/1982 | Gregory ........... H01R 43/0427 60/479 |
| 4,998,351 A * | 3/1991 | Hartmeister ......... B23D 15/14 30/180 |
| 5,335,530 A | 8/1994 | Homm |
| 5,722,170 A * | 3/1998 | Smith ............... B23D 15/145 227/10 |
| 6,101,862 A | 8/2000 | Rzasa et al. |
| 6,324,884 B1 | 12/2001 | Barjesteh et al. |
| 6,532,790 B2 | 3/2003 | Frenken |
| 6,564,610 B2 * | 5/2003 | Lefavour ............ B25B 27/10 60/477 |
| 6,792,789 B1 | 9/2004 | Faucher |
| 6,966,230 B2 | 11/2005 | Frenken |
| 7,066,003 B2 | 6/2006 | Lefavour et al. |
| D626,979 S * | 11/2010 | Anderson ............... D15/139 |
| 8,074,485 B2 | 12/2011 | College |
| 8,578,751 B2 | 11/2013 | Hofmann |
| D713,707 S | 9/2014 | Glockseisen |
| 8,839,653 B2 * | 9/2014 | Roman, Jr. ............ B25B 27/10 29/751 |
| 8,844,436 B2 | 9/2014 | Frenken |
| 9,085,024 B2 | 7/2015 | Frenken |
| 9,162,353 B2 | 10/2015 | Ciotti |
| 9,166,353 B1 | 10/2015 | Doornbos |
| 9,209,585 B2 * | 12/2015 | Houser ............. H01R 43/0427 |
| 9,227,254 B2 | 1/2016 | Westley |
| 9,352,429 B2 | 5/2016 | Gottschaldt |
| 9,440,280 B1 | 9/2016 | Utecht et al. |
| 10,173,085 B2 * | 1/2019 | Dehondt ............ A62B 35/0087 |
| 2013/0213735 A1 * | 8/2013 | Dehondt ............ A62B 35/0087 182/3 |

\* cited by examiner

TOOL HEAD

BACKGROUND

Unless otherwise indicated herein, the materials described in this section are not prior art to the claims and are not admitted to be prior art by inclusion in this section.

Hydraulic tools can be employed to provide a user with a mechanical advantage. For example, a hydraulic tool may take the form of a cutting device having blades for cutting an object into separate parts. As another example, a hydraulic tool may take the form of a crimping device for making crimping connections, thereby conjoining two separate pieces by deforming one or both pieces in a way that causes them to hold together.

BRIEF SUMMARY

According to an aspect of the present disclosure, a tool head includes a first frame having a first arm and a second arm extending from a base to a distal end. The tool head may also include a first blade in the frame between the first arm and the second arm. The first blade is movable from the base toward the distal end. The tool head further includes a second frame hingedly coupled to the first arm and may include a second blade. The second frame is configured to rotate between a closed-frame position and an open-frame position. The second frame extends from the first arm to the second arm in the closed-frame position to define a cutting zone between the first arm and the second arm. The second frame extends away from the second arm in the open-frame position to provide access to the cutting zone. The tool head further includes a trip lever hingedly coupled to the first arm and configured to rotate between an open-lever position and a closed-lever position. The trip lever extends from the first arm to the second arm in the closed-lever position. The trip lever is positioned outside of the operating zone in the open-lever position. The trip lever is in the open-lever position when the second frame is in the closed-frame position and the trip lever is in the closed-lever position when the second frame is in the open-frame position.

According to another aspect of the present disclosure, a method of cutting an object using a tool head is provided. The tool head includes a first frame hingedly coupled to a first end of a second frame. The first frame may include a first blade and the second frame may include a second blade. A second end of the second frame is releasably coupled to the first frame via a latch. The method includes actuating a release lever to move the latch from a closed-latch position to an open latch position. The latch releases the second end of the second frame from the first frame in the open-latch position. Responsive to actuating the release lever, the method includes rotating at least one of the second frame or a trip lever to cause (i) the second frame to move from a closed-frame position to an open-frame position and (ii) the trip lever to move from an open-lever position to a closed-lever position. The method then includes inserting an object into a operating zone of the tool head at a distal end of the first frame. Inserting the object into the operating zone moves the trip lever from the closed-lever position to the open-lever position using the object. Responsive to moving the trip lever to the open-lever position, the second frame moves from the open-frame position to the closed-frame position and couples to the first frame via the latch. Responsive to coupling the first frame to the second frame via the latch with the object in the operating zone. The method may also include the step of moving a first blade towards a second blade to cut an object.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

The present disclosure provides systems and methods for operating on an object such as, for example, a wire, a cable, a pipe, and the like. In particular, the present disclosure provides for a tool head that can be used for cutting, crimping, or otherwise operating on an object. The tool head comprises a trip lever that can beneficially improve ease of use and safety. The trip lever can, for example, facilitate opening and closing of the tool head to thereby facilitate inserting an object into an operating zone. Where the operating zone comprises a cutting zone, blades may be actuated to cut the object. Further, the trip lever can improve safety by extending across an opening to the cutting zone when the tool head is in an open state. Tools and methods for acting on objects (i.e., cutting, crimping, etc.), which achieve these and other benefits, will now be described.

Figure 1:
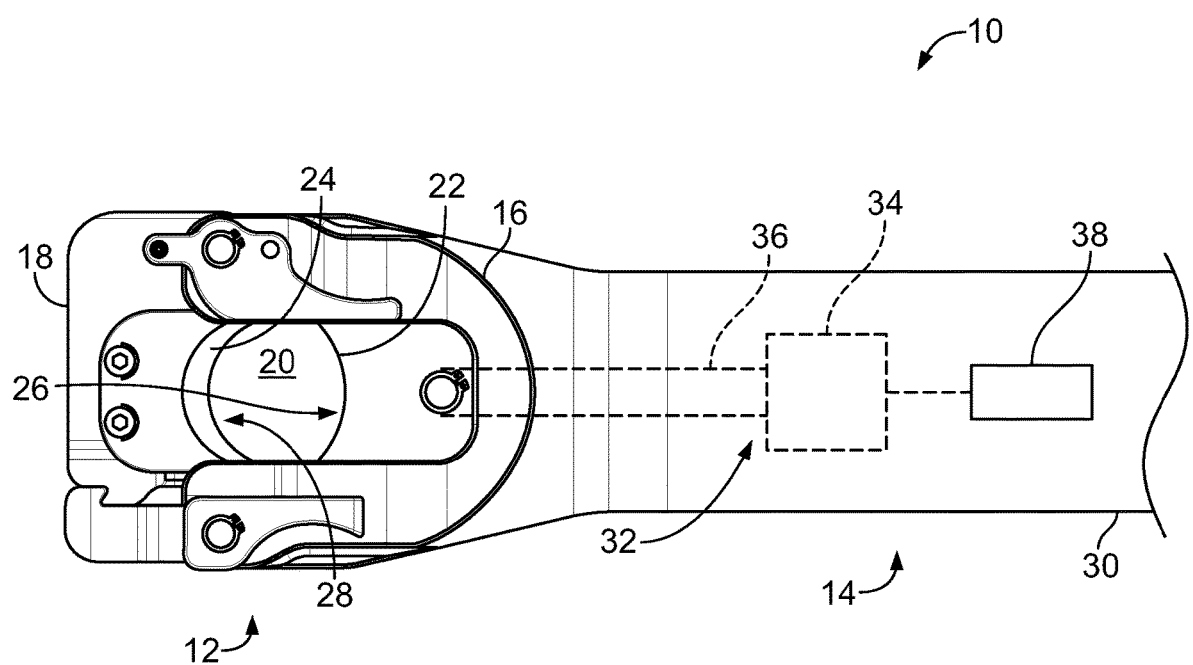
FIG. 1 is a plan side view of a tool according to an example embodiment.

FIG. 1 depicts a cutting tool 10 in accordance with aspects of the present disclosure. The cutting tool 10 includes a tool head 12 and an actuator assembly 14. The tool head 12 includes a first frame 16 and a second frame 18. The second frame 18 is movable relative to the first frame 16 such that the tool head 12 can be (i) opened to insert an object into a cutting zone 20 of the tool head 12, and (ii) closed to facilitate cutting the object in the cutting zone 20. In particular, to cut an object in the cutting zone 20, the tool head 12 includes a first blade 22 slidably disposed in the first frame 16 and a second blade 24 coupled to the second frame 18. The first blade 22 is movable from a proximal end 26 of the cutting zone 20 to the second blade 24 at a distal end 28 of the cutting zone 20. The first blade 22 and the second blade 24 can thus provide for a guillotine-type cutting action. The tool head 12 is described in detail below with respect to FIGS. 2-6H.

The actuator assembly 14 is coupled to a proximal end of the tool head 12 and configured to distally move the first blade 22 to cut the object in the cutting zone 20. In general, the actuator assembly 14 can have an actuator body 30 including a drive mechanism 32 coupled to the first blade 22. For example, the drive mechanism 32 can include a hydraulic pump 34 that distally moves a ram 36, which imparts corresponding distal movement to the first blade 22. In other examples, the drive mechanism 32 can include additional or alternative devices such as, for instance, a screw driven by an electric motor.

The drive mechanism 32 can be further coupled to an actuator 38, which a user can operate to actuate the drive mechanism 32. For example, the actuator 38 can include a switch that is movable between a first switch position and a second switch position. When the switch is in the first switch position, the drive mechanism 32 causes the first blade 22 to be in a retracted position. Whereas, when the switch is in the second switch position, the drive mechanism 32 causes the first blade 22 to move toward the second blade 24 to cut an object in the cutting zone 20. In an additional or alternative example, the actuator 38 can include a pump handle and release lever. Pumping the pump handle actuates the drive mechanism causing the ram 36 to move distally and thereby move the first blade 22 toward the second blade 24. Actuating the release lever causes the first blade 22 to return to the retracted position.

Figure 2:
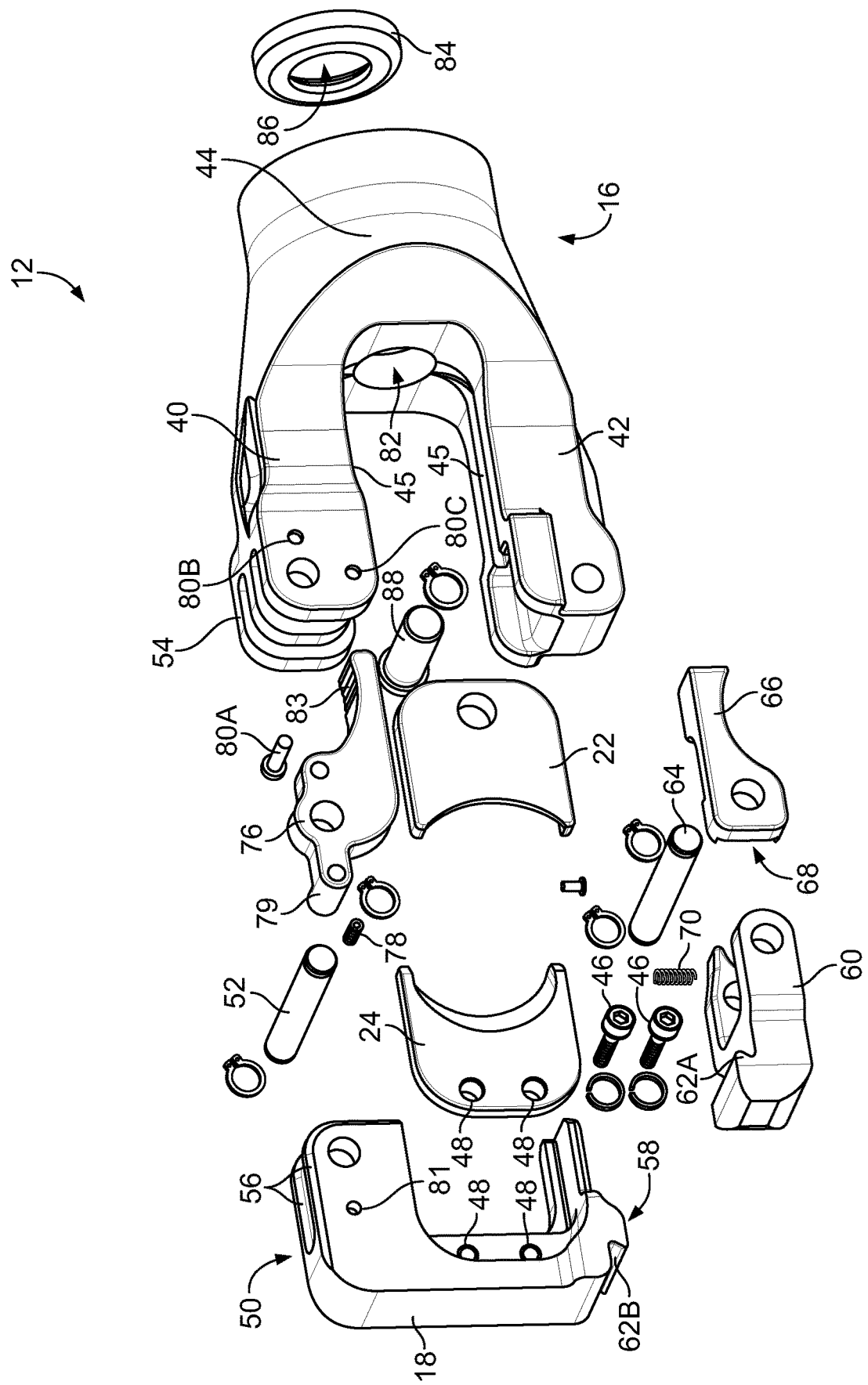
FIG. 2 is an exploded view of the tool head for the tool shown in FIG. 1.
Figure 3:
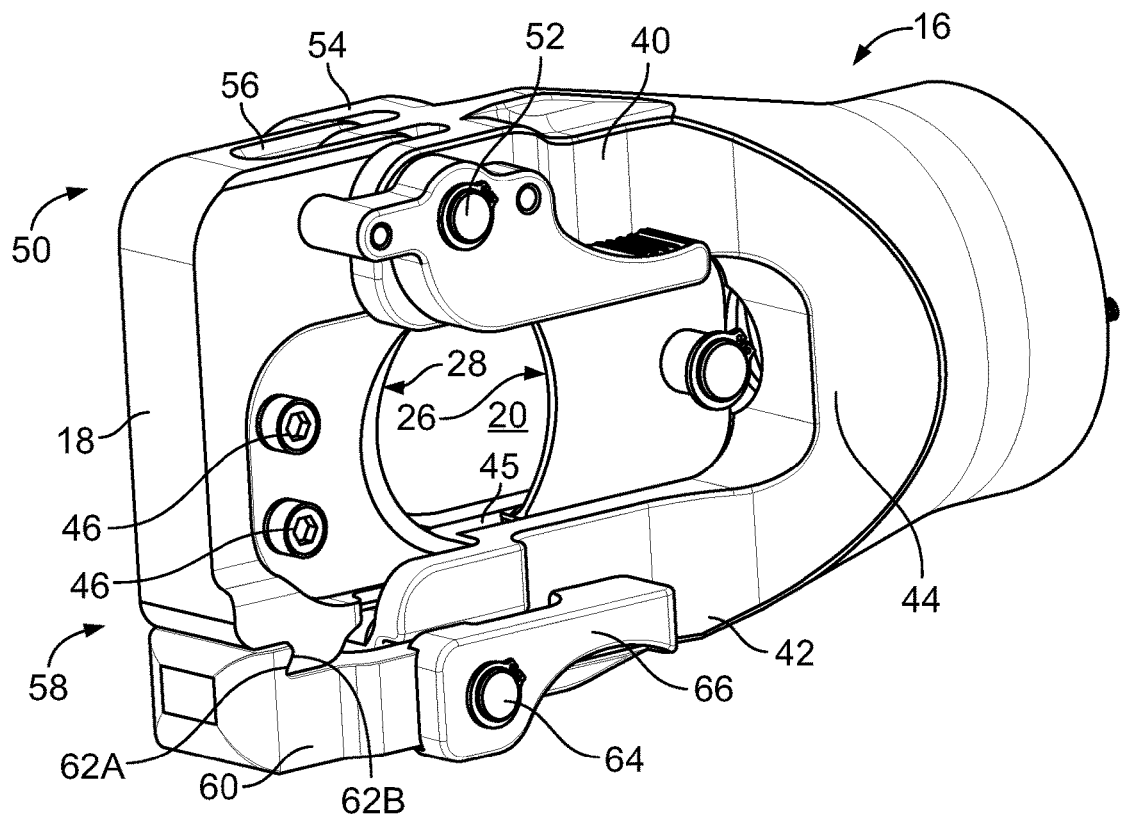
FIG. 3 is a perspective view of the tool head in a closed state.
Figure 4:
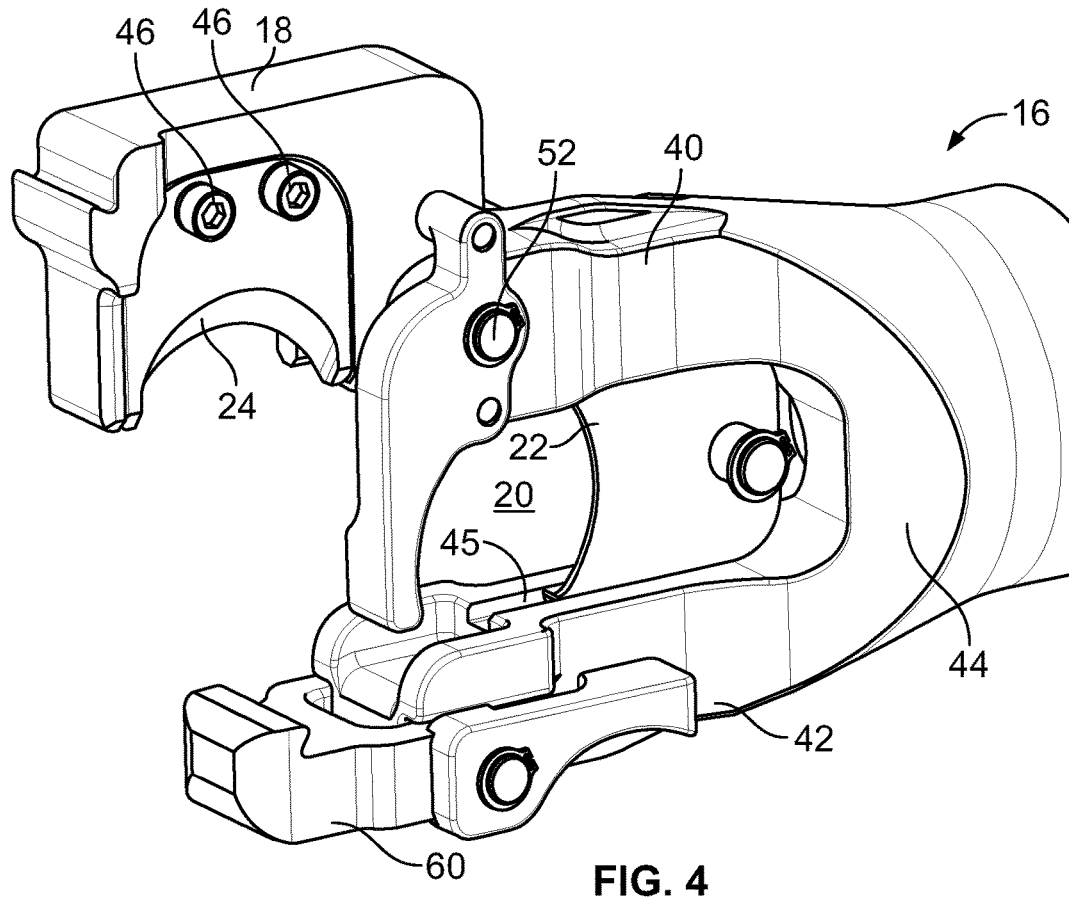
FIG. 4 is a perspective view of the tool head in an open state.

FIGS. 2-4 further depict the tool head 12 according to aspects of the present disclosure. In particular, FIG. 2 depicts an exploded view of the tool head 12, FIG. 3 depicts a perspective view of the tool head 12 with the second frame 18 in a closed-frame position, and FIG. 4 depicts a perspective view of the tool head 12 with the second frame 18 in an open-frame position. As shown in FIGS. 2-4, the first frame 16 has a first arm 40 and a second arm 42 extending from a base 44. The first arm 40 is generally parallel to the second arm 42. The first arm 40 and the second arm 42 are also generally of equivalent length. In this configuration, the first frame 16 is in the form of a clevis (i.e., U-shaped); however, the first frame 16 can have a different form in other examples. Additionally, although the first frame 16 is formed from a single piece as a unitary body in the illustrated example, the first frame 16 can be formed from multiple pieces in other examples.

The first blade 22 is slidably disposed in the first frame 16 between the first arm 40 and the second arm 42. For example, the first blade 22 can be slidably disposed between opposing guide channels 45 on the first arm 40 and the second arm 42. As shown in FIG. 2, the guide channels 45 can extend generally in a direction from the proximal end 26 to the distal end 28 along inner surfaces of the first arm 40 and the second arm 42. The guide channels 45 can help to maintain the alignment of the first blade 22 relative to the second blade 24 as the first blade 22 moves in the cutting zone 20.

As noted herein, the second blade 24 is coupled to the second frame 18. In FIGS. 2-4, the second blade 24 is releasably coupled to the second frame 18 via one or more first coupling members 46. For example, the second blade 24 and the second frame 18 can each have one or more apertures 48 through which the first coupling member(s) 46 can extend to couple the second blade 24 to the second frame 18. By releasably coupling the second blade 24 to the second frame 18, the second blade 24 can be readily replaced and/or repaired. In other examples, the second frame 18 and the second blade 24 can be formed from a single piece as a unitary body. More generally, the second frame 18 and the second blade 24 can be considered to be a second blade assembly.

The second frame 18 is hingedly coupled to the first arm 40 at a first end 50 of the second frame 18. In particular, the second frame 18 can rotate between a closed-frame position as shown in FIG. 3 and an open-frame position as shown in FIG. 4. In the closed-frame position, the second frame 18 extends from the first arm 40 to the second arm 42 such that the cutting zone 20 is bounded by the first blade 22, the second blade 24, the first arm 40, and the second arm 42. In the open-frame position, the second frame 18 extends away from the second arm 42 to provide access to the cutting zone 20 at the distal end 28.

In FIGS. 3-4, the second frame 18 is hingedly coupled to the first arm 40 via a first pin 52 extending through the first end 50 of the second frame 18 and a distal end portion of the first arm 40. The distal end portion of the first arm 40 includes a plurality of prongs 54 separated by gaps, the second frame 18 includes a plurality of prongs 56, and each prong 56 is disposed in a respective gap of the first arm 40. This arrangement can help to improve stability and alignment of the second frame 18 relative to the first frame 16. This in turn helps to improve alignment of the first blade 22 and the second blade 24 during a cutting operation. Despite these benefits, the second frame 18 can be hingedly coupled to the first arm 40 differently in other examples.

As shown in FIG. 3, a second end 58 of the second frame 18 is releasably coupled to the second arm 42, via a latch 60, when the second frame 18 is in the closed-frame position. In general, the latch 60 is configured to rotate relative to the second arm 42 between (i) a closed-latch position in which the latch 60 can couple the second arm 42 to the second frame 18 as shown in FIG. 3 and (ii) an open-latch position in which the latch 60 releases the second arm 42 from the second frame 18 as shown in FIG. 4. For example, the latch 60 can be hingedly coupled to the second arm 42 via a second pin 64, and the latch 60 can thus rotate relative to the second arm 42 about the second pin 64. Although FIG. 4 shows the latch 60 in the open-latch position while the second frame 18 is in the open-frame position, the latch 60 can be in the open-latch position when the second frame 18 is in other positions. Similarly, the latch 60 can be in the closed-latch position when the second frame 18 is in the open-frame position (as will be apparent from the description below).

To releasably couple the latch 60 to the second frame 18, the latch 60 and the second frame 18 include corresponding retention structures 62A, 62B. For example, in FIG. 3, the latch 60 includes a proximally-sloped top surface 62A that engages a distally-sloped bottom surface 62B of the second frame 18 when the latch 60 is in the closed-latch position and the second frame 18 is in the closed-frame position. The pitch of the sloped surfaces 62A, 62B is configured such that the surface 62A of the latch 60 can release from the surface 62B of the second frame 18 when the latch 60 moves to the open-latch position. Similarly, the pitch of the sloped surfaces 62A, 62B is configured such that the engagement between the surface 62A and the surface 62B prevents rotation of the second frame 18 when the second frame 18 is in the closed-frame position and the latch 60 is in the closed-latch position.

A release lever 66 is coupled to the latch 60 and operable to move the latch 60 from the closed-latch position to the open-latch position. The release lever 66 can be hingedly coupled to the second arm 42 via the second pin 64 such that the release lever 66 and the latch 60 pivot about a common pivot point. In FIGS. 2-4, the release lever 66 receives a proximal portion of the latch 60 in a slot 68 on an inner side of the release lever 66. In this arrangement, the slot 68 engages the proximal portion of the latch 60 such that rotation of the release lever 66 causes corresponding rotation of the latch 60. The release lever 66 is thus operable by a user to release the second frame 18 from the latch 60 and the second arm 42 so that the second frame 18 can be moved from the closed-frame position shown in FIG. 3 to the open-frame position shown in FIG. 4.

Figure 5A:
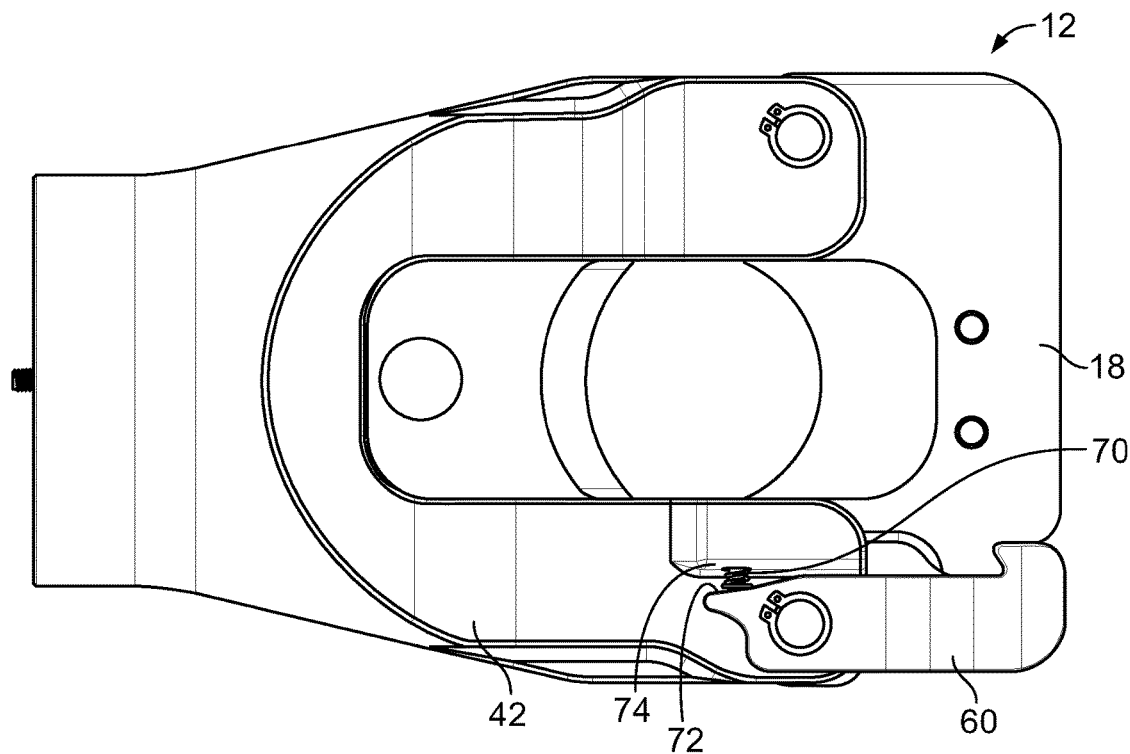
FIG. 5A is a back side view of the tool head in the closed state.
Figure 5B:
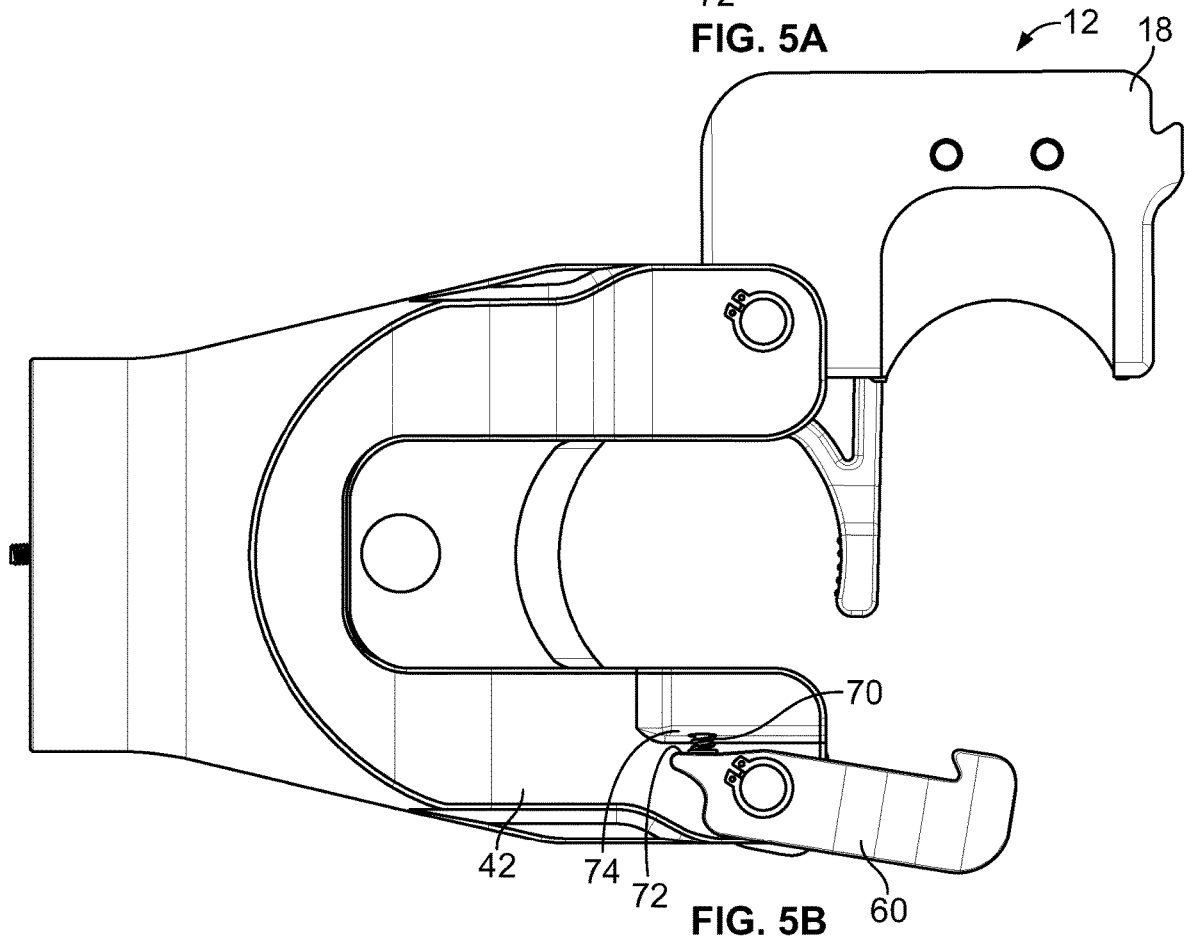
FIG. 5B is a back side view of the tool head in the open state.

The latch 60 can be biased towards the closed-latch position by a biasing member. For example, the biasing member can be a spring 70 extending between the second arm 42 and the latch 60 to bias the latch 60 toward the closed-latch position. FIG. 5A and FIG. 5B are back side views of the tool head 12 showing the spring 70. In particular, FIG. 5A shows the spring 70 when the latch 60 is in the closed-latch position and FIG. 5B shows the spring 70 when the latch 60 is in the open-latch position. As shown in FIGS. 5A-5B, the spring 70 extends between a top surface 72 on a proximal portion of the latch 60 and a bottom surface 74 on a distal portion of the second arm 42. Because the second arm 42 is fixed and the latch 60 is rotatable, the spring 70 applies a biasing force directed from the second arm 42 to the proximal portion of the latch 60. In this arrangement, the spring 70 thus biases the latch 60 to rotate counter-clockwise in FIGS. 5A-5B toward the closed-latch position.

Referring again to FIGS. 2-4, the tool head 12 also includes a trip lever 76 hingedly coupled to the first arm 40 (e.g., via the first pin 52). In particular, the trip lever 76 is operable to rotate between (i) an open-lever position as shown in FIG. 3 and (ii) a closed-lever position as shown in FIG. 4. In the open-lever position, the trip lever 76 is positioned outside of the cutting zone 20. For example, the trip lever 76 extends generally parallel to the first arm 40 in the open-lever position shown in FIG. 3. Because the trip lever 76 is outside of the cutting zone 20 in the open-lever position, the trip lever 76 does not affect or obstruct the cutting of an object in the cutting zone 20 by the first blade 22 and the second blade 24. In the closed-lever position, the trip lever 76 extends into the cutting zone 20. For example, the trip lever 76 extends from the first arm 40 to the second arm 42 in the closed-lever position shown in FIG. 4. More particularly, the trip lever 76 is generally perpendicular to the first arm 40 and the second arm 42 in the closed-lever position shown in FIG. 4.

The trip lever 76 is fixedly coupled to the second frame 18 (e.g., a peg 78 can fixedly couple a distal portion 79 of the trip lever 76 to an aperture 81 of the second frame 118). As a result, the trip lever 76 is in the open-lever position when the second frame 18 is in the closed-frame position and the trip lever 76 is in the closed-lever position when the second frame 18 is in the open-frame position. Further, moving the second frame 18 from the closed-frame position to the open-frame position causes the trip lever 76 to move from the open-lever position to the closed lever-position. Moving the trip lever 76 from the closed-lever position to the open-lever position causes the second frame 18 to move from the open-frame position to the closed-frame position. A user can thus use the trip lever 76 to as an actuator for moving the second frame 18. The trip lever 76 can include a grip portion 83 to facilitate such use of the trip lever 76.

To assist positioning and/or retaining the trip lever 76 in the open-lever position and the closed-lever position, the trip lever 76 includes a first retention structure 80A that is configured to (i) engage a second retention structure 80B of the first frame 16 in the open-lever position, and (ii) engage a third retention structure 80C of the first frame 16 in the closed-lever position. For example, the first retention structure 80A, the second retention structure 80B, and the third retention structure 80C can be a ball detent system. In an example implementation, the first retention structure 80A can be a ball, whereas the second retention structure 80B and the third retention structure 80C are detents.

As shown in FIG. 2, the first frame 16 further includes a passage 82 extending through the base 44. When the tool head 12 is coupled to the actuator assembly 14, the ram 36 can extend through the passage 82 and couple to the first blade 22 in the first frame 16. In this way, the ram 36 can move distally through the base 44 to thereby move the first blade 22 toward the second blade 24. As one example, the first blade 22 can be releasably coupled to the ram 36 by one or more second coupling members 88 (e.g., a releasable pin or a screw). This can allow for the first blade 22 to be replaced and/or repaired, and/or facilitate removably coupling the tool head 12 to the actuator assembly 14.

As also shown in FIG. 2, the tool head 12 includes a stop member 84 that is disposed in the passage 82 of the first frame 16. The stop member 84 includes an aperture 86 through which the ram 36 can pass to move the first blade 22 over a predetermined stroke length during a cutting operation. At the end of the stroke, the ram 36 engages the stop member 84 so as to inhibit (or prevent) further distal movement of the ram 36. The dimensions and/or shape of the aperture 86 and the ram 36 may thus be configured to stop distal movement of the ram 36 after a predetermined stroke length has been achieved.

As one example, the stop member 84 can be ring-shaped and the ram 36 can have a contoured or cone-shaped exterior surface such that the ram 36 can freely pass through the aperture 86 during the stroke, but then the ram 36 is inhibited from further distal movement due to the exterior surface of the ram 36 engaging the stop member 84 at the end of the stroke. The ram 36 can additionally or alternatively include other features for engaging the stop member 84 such as, for example, a protrusion on the exterior surface of the ram 36.

In the illustrated example, the stop member 84 is coupled to the first frame 16. This may facilitate manufacture and assembly. The stop member 84 may be made from a material that can withstand forces applied to the stop member 84 by the ram 36. The material of the stop member 84 may be different than the material of the first frame 16. For example, the first frame 16 can be made of aluminum and the stop member 84 can be made of steel. In other examples, the first frame 16 and the stop member 84 can be made from the same material, and/or the first frame 16 and the stop member 84 can be formed from a single piece as a unitary body.

The tool 10 can further include a return spring (not shown) configured to bias the first blade 22 in the proximal direction towards the retracted position shown in FIGS. 3-4. The return spring can thus cause the first blade 22 to return to its retracted position upon completion of a distal stroke of the ram 36 (during a cutting operation). In some aspects, the stop member 84 can be configured to retain an end of the return spring to assist in mitigating movement of the return spring, which might otherwise potentially cause the first blade 22 and/or the ram 36 to jam. In one embodiment, one end of the spring is contained within the inner diameter of the cupped side of the stop member. The other end of the spring is constrained on the outer diameter by the cylinder wall and the inner diameter by the outer diameter of the ram and pushes against the ram in the axial direction biased toward retraction of the ram.

Figure 6A:
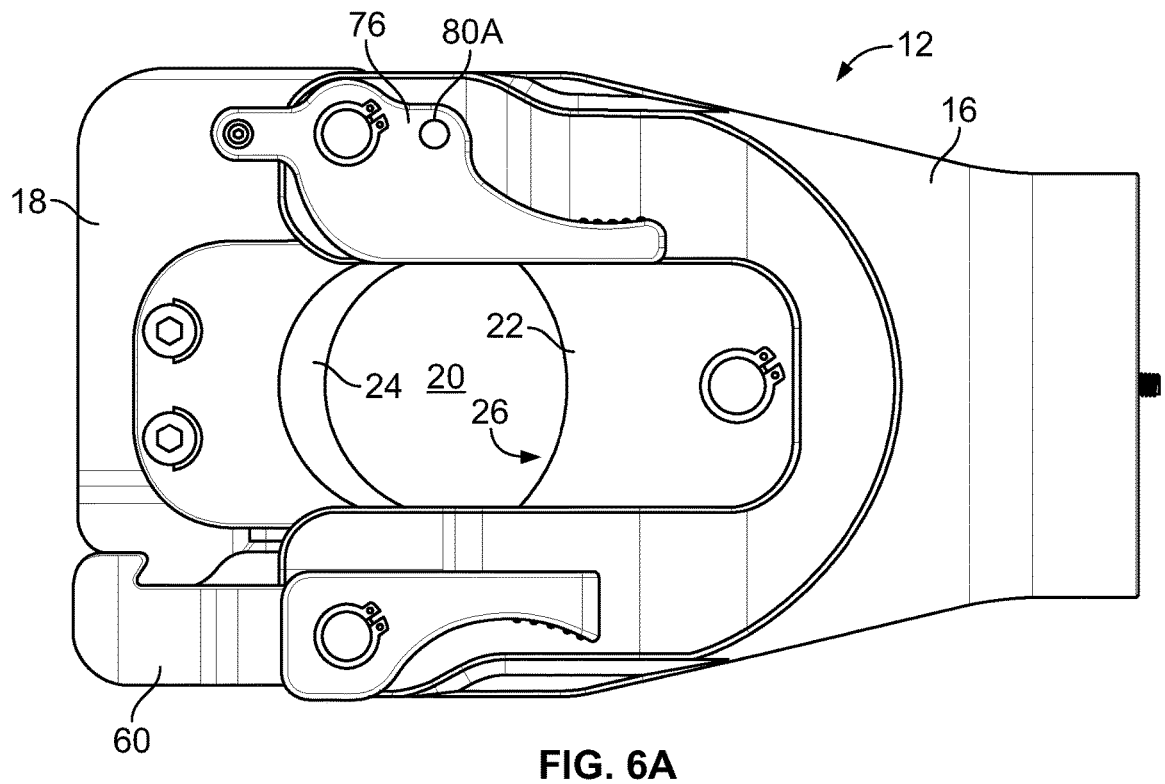
FIG. 6A is a side view of the tool head in a first state for an example operation of the tool head.

FIGS. 6A-6H depict an example operation of the tool head 12 according to aspects of the disclosure. FIG. 6A depicts the tool head 12 with the second frame 18 secured in the closed-frame position by the latch 60 in the closed-latch position. With the second frame 18 in the closed-frame position, the trip lever 76 is in the open-lever position. The second frame 18 and the trip lever 76 are retained in the closed-frame position and the open-lever position, respectively, by the engagement of the first retention structure 80A and the second retention structure 80B. Additionally, the first blade 22 is in a retracted position at the proximal end 26 of the cutting zone 20 in FIG. 6A.

Figure 6B:
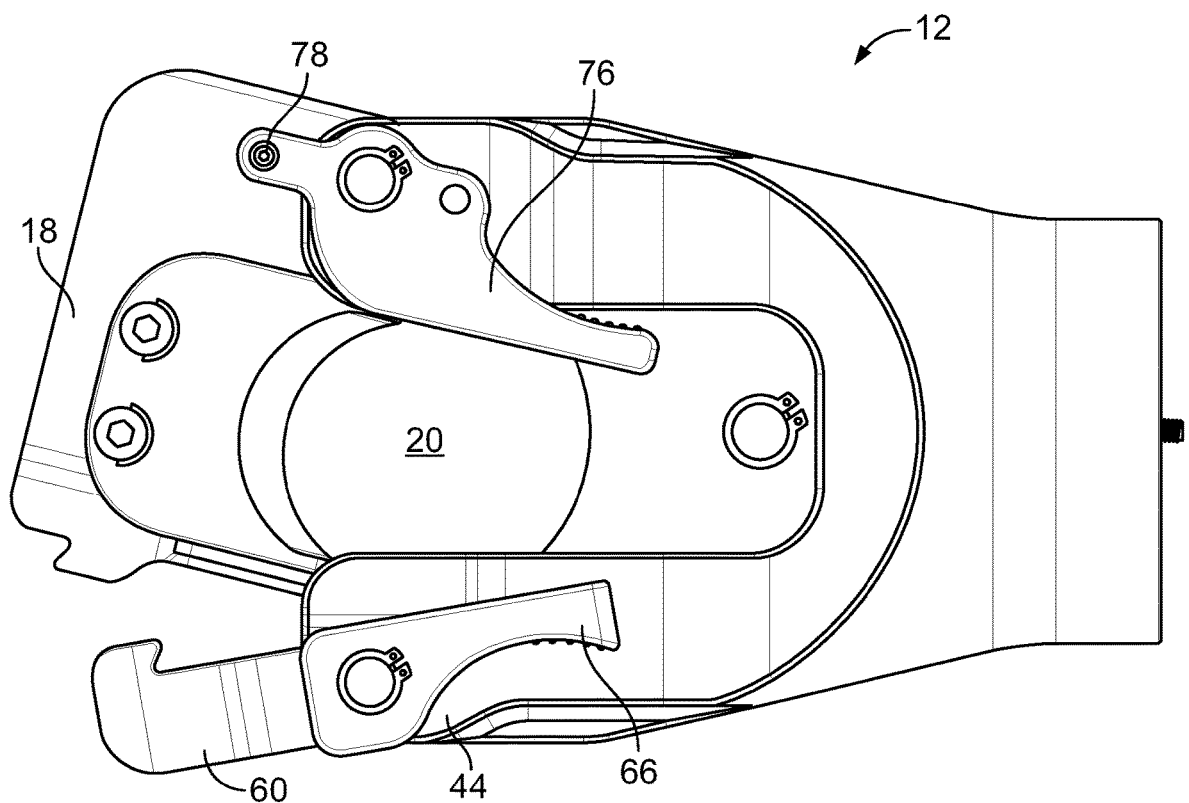
FIG. 6B is a side view of a tool head in a second state for the example operation of the tool head.

FIG. 6B shows the second frame 18 in an intermediate position between the closed-frame position and the open-frame position. To transition the tool head 12 from the state depicted in FIG. 6A to the state depicted in FIG. 6B, a user can (i) actuate the release lever 66 to move the latch 60 from the closed-latch position to the open-latch position and (ii) manually move the second frame 18 and/or the trip lever 76 with sufficient force to overcome the engagement between the first retention structure 80A and the second retention structure 80B. For example, moving the latch 60 to the open-latch position releases the second frame 18 from the second arm 44, which allows the second frame 18 to be moved to the intermediate position. As shown in FIG. 6B, the trip lever 76 is in a position corresponding to the intermediate position of the second frame 18 due to the coupling between the trip lever 76 and the second frame 18 via the peg 78. The trip lever 76 thus extends partially into the cutting zone 20 in this intermediate position. As noted above, the user can move the second frame 18 to the intermediate position by manually moving the second frame 18 and/or manually moving the trip lever 76.

Figure 6C:
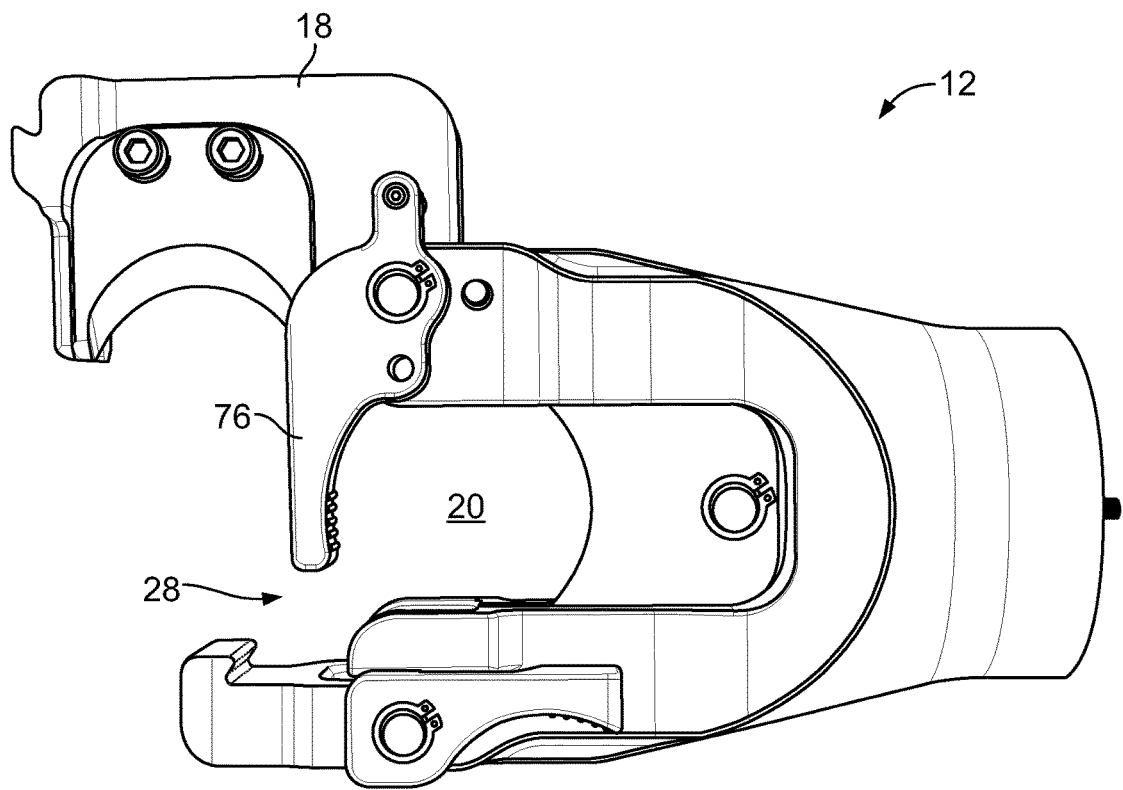
FIG. 6C is a side view of the tool head in a third state for the example operation of the tool head.

FIG. 6C shows the tool head 12 after the second frame 18 and the trip lever 76 have been rotated to the open-frame position and the closed-lever position, respectively. The trip lever 76 is retained in the closed-lever position by the engagement between the first retention structure 80A and the third retention structure 80C. Additionally, in the closed-lever position, the trip lever 76 extends into the cutting zone 20 at the distal end 28. In this way, the trip lever 76 is positioned such that the trip lever 76 can be engaged when an object is inserted into the cutting zone 20 via the distal end 28. As also shown in FIG. 6C, the latch 60 returned to the closed-latch position due to the biasing force applied by the biasing member 70 to the latch 60.

Figure 6D:
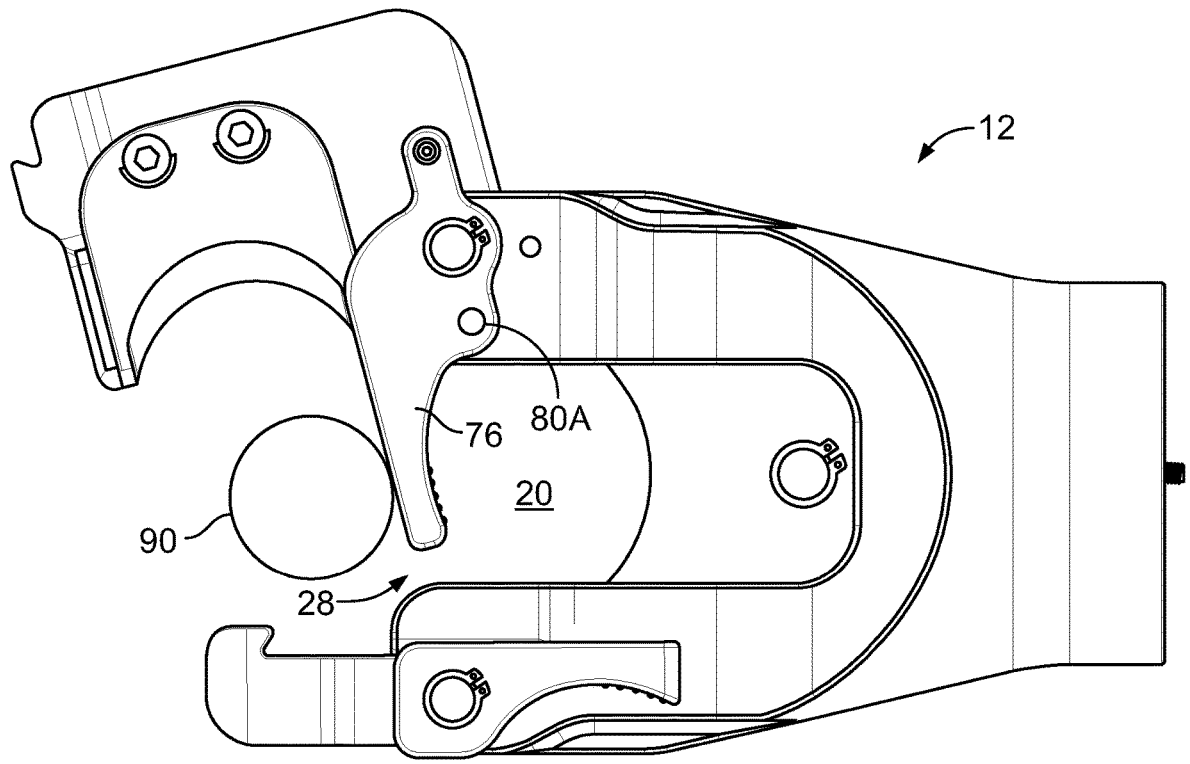
FIG. 6D is a side view of a tool head in a fourth state for the example operation of the tool head.

FIG. 6D shows the tool head 12 as an object 90 (e.g., a wire, a connector, a cable, a pipe, etc.) is initially inserted into an operating zone at the distal end 28. Where the tool head 12 comprises a cutter head, this operating zone comprises a cutting zone 20. As shown in FIG. 6D, the object 90 engages the trip lever 76 at the distal end 28. The force applied by the object 90 to the trip lever 76 overcomes the retention force between the first retention structure 80A and the third retention structure 80C. Inserting the object 90 into the cutting zone 20 thus causes the trip lever 76 and second frame 18 to rotate towards the open-lever position and closed-frame position, respectively.

Figure 6E:
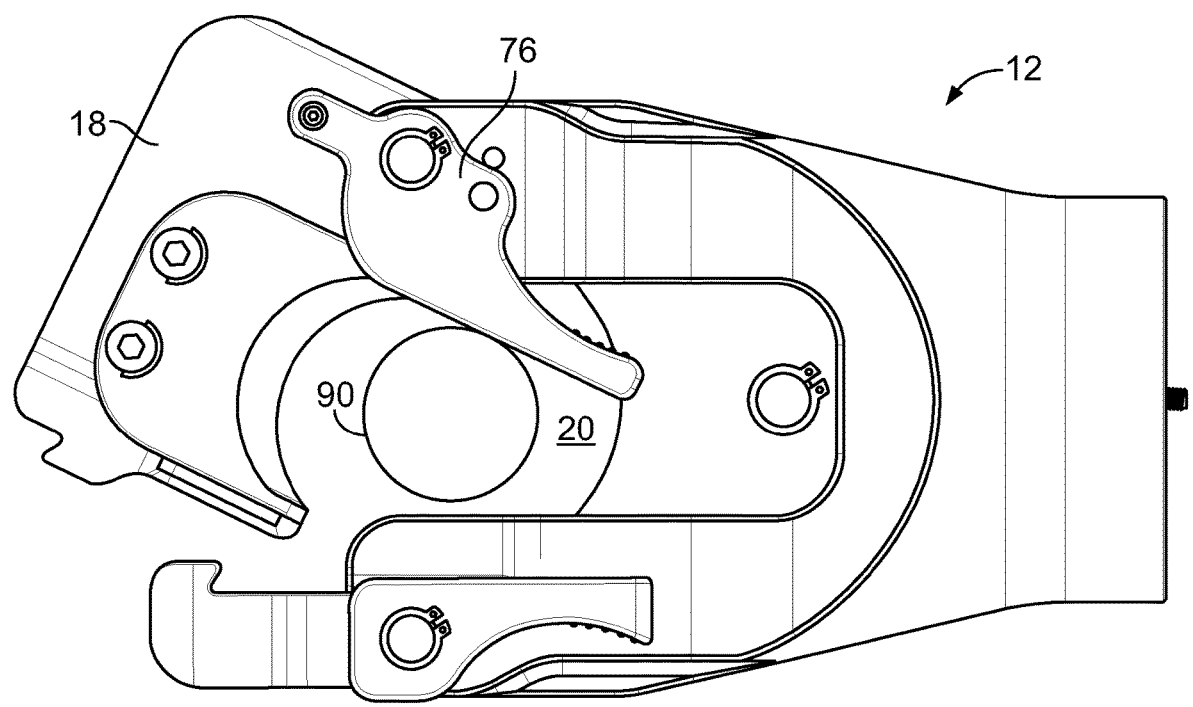
FIG. 6E is a side view of a tool head in a fifth state for the example operation of the tool head.

FIG. 6E shows the tool head 12 as the object 90 is further inserted into the cutting zone 20. As shown in FIG. 6E, inserting the object 90 further into the cutting zone 20 causes the trip lever 76 and the second frame 18 to move further towards the open-latch position and the closed-frame position, respectively. Thus, the trip lever 76 facilitates closing the second frame 18 behind the object 90 as the object 90 is inserted into the cutting zone 20. However, in some additional or alternative examples, the second frame 18 can be configured to close partially or entirely under gravity forces once the trip lever 76 is initially moved from the closed-lever position toward the open-lever position (i.e., responsive to overcoming the retention force between the first retention structure 80A and the third retention structure 80C).

Figure 6F:
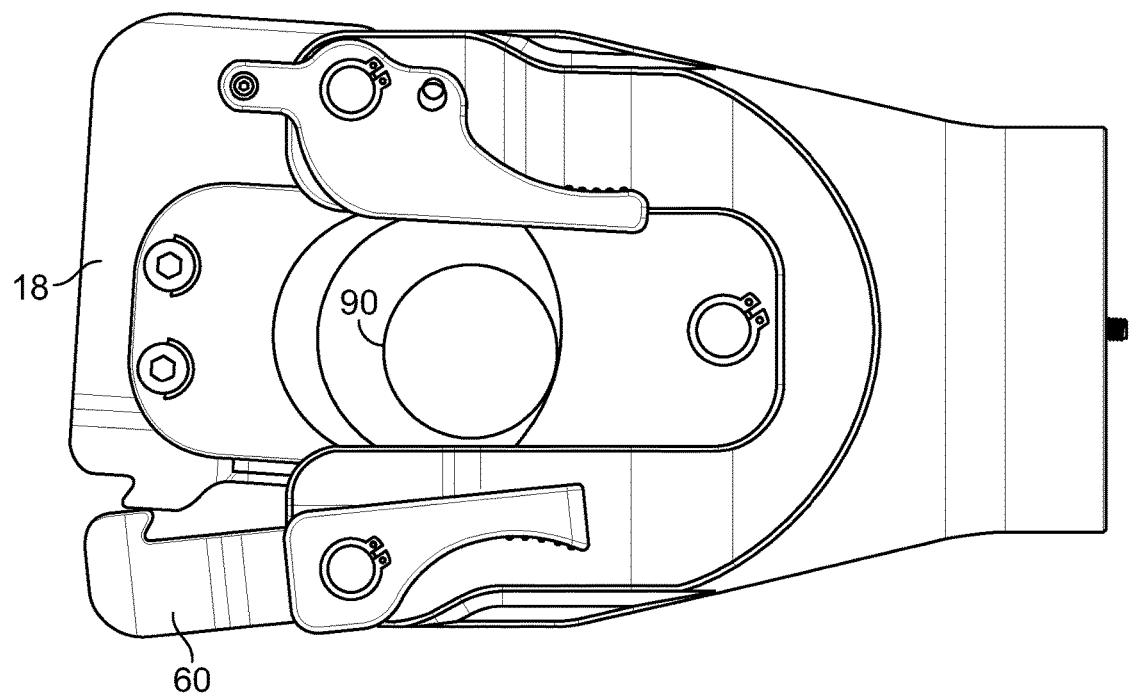
FIG. 6F is a side view of a tool head in a sixth state for the example operation of the tool head.
Figure 6G:
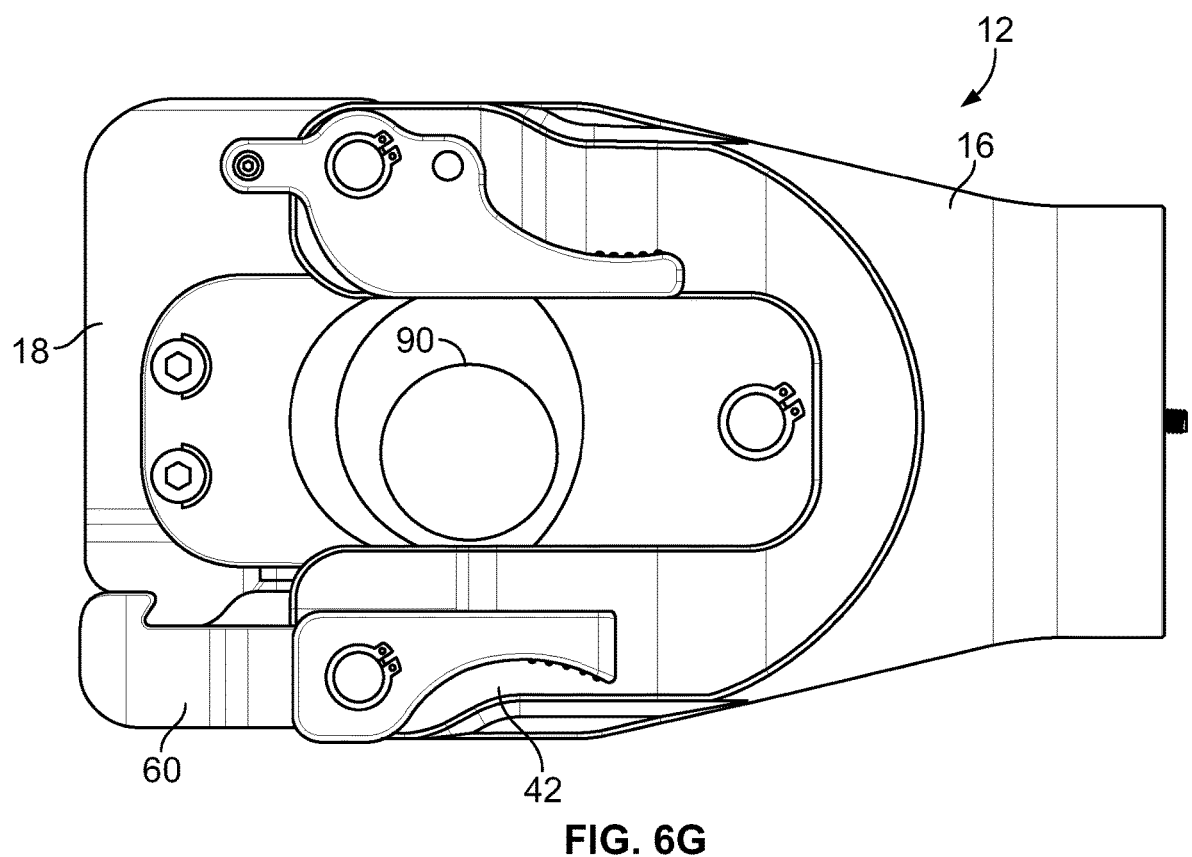
FIG. 6G is a side view of a tool head in a seventh state for the example operation of the tool head.

FIG. 6F shows the tool head 12 as the second frame 18 initially engages the latch 60. As shown in FIG. 6F, the second frame 18 applies a force to the latch 60, which counters the biasing force applied to the latch 60 by the biasing member 70. The second frame 18 thus moves towards the open-latch position. The second frame 18 further moves the latch 60 until the sloped surface 62B passes over the sloped surface 62A at which point the latch 60 moves back into the closed-latch position (via the biasing member 70) to couple second frame 18 to the second arm 42 of the first frame 16, as shown in FIG. 6G.

Figure 6H:
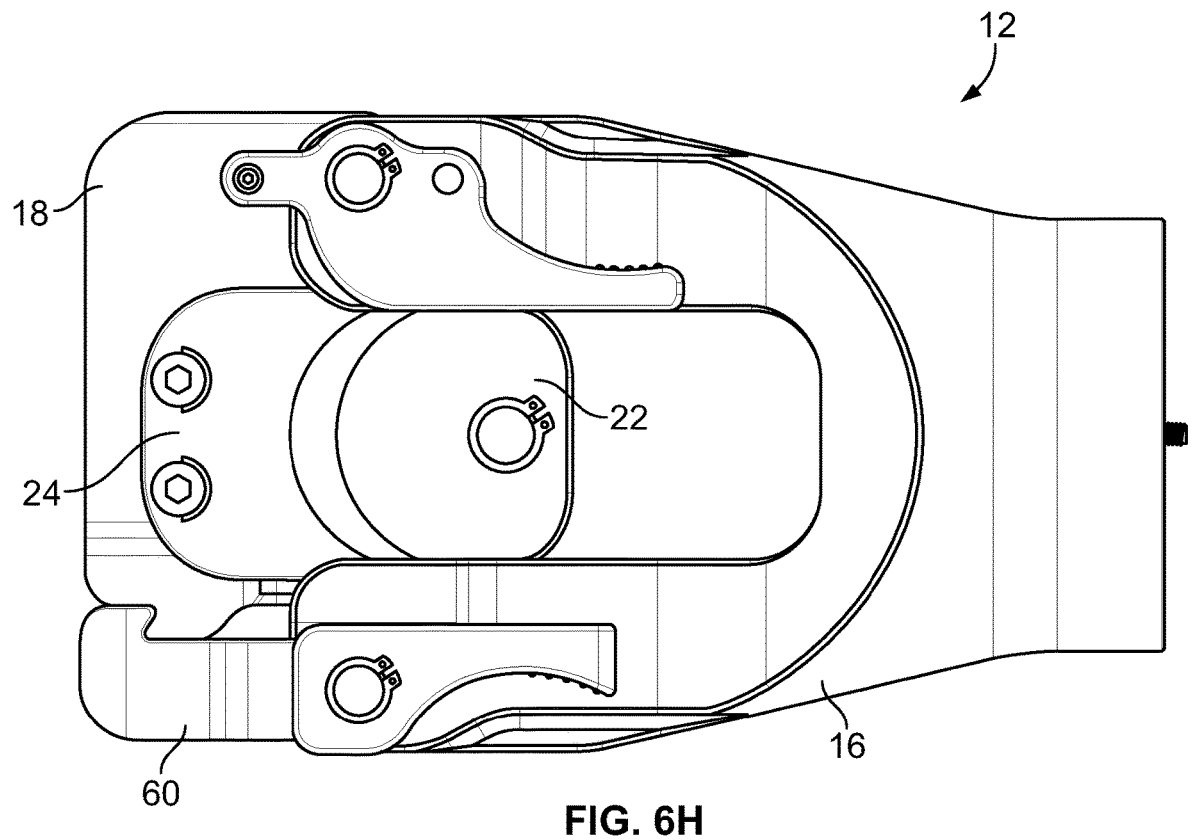
FIG. 6H is a side view of a tool head in an eighth state for the example operation of the tool head.

With the object 90 inserted in the cutting zone 20 and the second frame 18 coupled to the first frame 16 (via the latch 60), the drive mechanism 32 can be actuated to cause the first blade 22 to move from the retracted position toward the second blade 24. As the first blade 22 moves distally toward the second blade 24, the object 90 is cut into separate pieces by the first blade 22 and the second blade 24 in guillotine manner. FIG. 6H shows the tool head 12 with the first blade 22 in a distal position after cutting the object 90.

Figure 7:
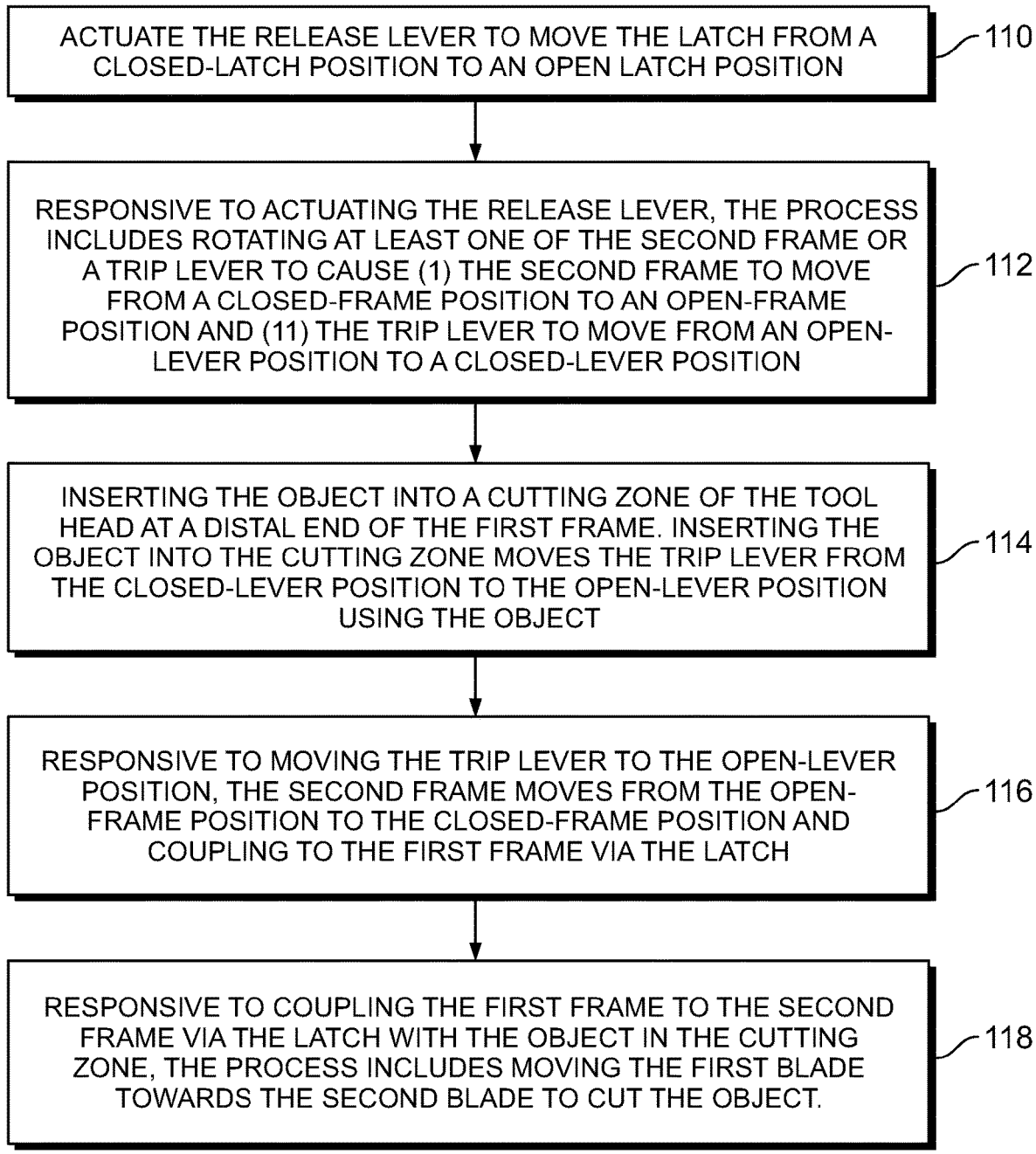
FIG. 7 is a flowchart of a process for cutting an object according to an example embodiment.

FIG. 7 depicts a flowchart of an example process 100 for cutting an object using the cutting tool 10 described above. As noted above, the cutting tool includes a tool head having a first frame hingedly coupled with a second frame at a first end. A second end of the second frame is releasably coupled to the first frame via a latch. The tool head further includes a release lever and a trip lever as described above. Where the tool comprises a cutting tool, the first frame will be configured to include a first blade and the second frame will be configured to include a second blade.

At block 110, the process includes actuating the release lever to move the latch from a closed-latch position to an open latch position. The latch releases the second end of the second frame from the first frame in the open-latch position. At block 112, responsive to actuating the release lever, the process includes rotating at least one of the second frame or a trip lever to cause (i) the second frame to move from a closed-frame position to an open-frame position and (ii) the trip lever to move from an open-lever position to a closed-lever position. At block 114, the object is inserted into an operating zone of the tool head at a distal end of the first frame. Inserting the object into the operating zone moves the trip lever from the closed-lever position to the open-lever position using the object. At block 116, responsive to moving the trip lever to the open-lever position, the second frame moves from the open-frame position to the closed-frame position and couples to the first frame via the latch. At block 118, responsive to coupling the first frame to the second frame via the latch with the object in the operating zone, the process includes (for a cutting tool) moving the first blade towards the second blade to cut the object.

Exemplary embodiments have been described above. Those skilled in the art will understand, however, that changes and modifications may be made to these embodiments without departing from the true scope and spirit of the disclosure. The description of the different advantageous embodiments has been presented for purposes of illustration and description, and is not intended to be exhaustive or limited to the embodiments in the form disclosed. As just one example, the tool head may comprise a cutting tool head for use with a hydraulic tool but other tool heads may also be used (e.g., a crimping tool head).

Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A tool head comprising:
    a first frame having a first arm and a second arm extending from a base to a distal end, wherein a distal end portion of the first arm comprises a plurality of prongs separated by at least one gap, the first frame including a first tool;
    a second frame hingedly coupled to the first arm,
    wherein the second frame is configured to rotate between a closed-frame position and an open-frame position, wherein the second frame extends from the first arm to the second arm in the closed-frame position to enclose an operating zone between the first arm and the second arm, wherein the second frame extends away from the second arm in the open-frame position to provide access to the operating zone; and
    a trip lever hingedly coupled to the first arm and configured to rotate between an open-lever position and a closed-lever position, wherein the trip lever is coupled to the first arm at an exterior surface of the distal end portion of the first arm, such that the trip lever is outside the at least one gap in both the open-lever position and the closed-lever position, wherein the trip lever extends from the first arm toward the second arm in the closed-lever position, wherein the trip lever is positioned outside of the operating zone in the open-lever position, wherein the first arm has a first surface facing the operating zone, wherein the trip lever does not extend past the first surface into the operating zone when the trip lever is in the open-lever position, such that the trip lever is not disposed between the first arm and the second arm of the first frame when the trip lever is in the open-lever position, wherein the trip lever is in the open-lever position when the second frame is in the closed-frame position and the trip lever is in the closed-lever position when the second frame is in the open-frame position.

2. The tool head of claim 1, further comprising:
    wherein the first tool is a first blade in the first frame between the first arm and the second arm, wherein the first blade is movable from the base toward the distal end, and
    the second frame hingedly coupled to the first arm includes a second blade.

3. The tool head of claim 2, wherein the operating zone comprises a cutting zone, and
    wherein the cutting zone is bounded by the first blade, the second blade, the first arm, and the second arm.

4. The tool head of claim 2, further comprising a stop in the base, wherein the stop is configured to limit a stroke length of a ram that moves the first blade from the base towards the second blade at the distal end.

5. The tool head of claim 4, wherein the stop is ring-shaped.

6. The tool head of claim 1, wherein the second frame and the trip lever are coupled such that moving the trip lever between the open-lever position and the closed-lever position causes the second frame to correspondingly move between the closed-frame position and the open-frame position.

7. The tool head of claim 6, wherein the trip lever is fixedly coupled to a first blade.

8. The tool head of claim 1, wherein the first arm, the second arm, and the base are formed from a single piece as a unitary body.

9. The tool head of claim 1, wherein the first arm is generally parallel to the second arm such that the first frame is U-shaped.

10. The tool head of claim 1, further comprising a pin hingedly coupling the trip lever and the second frame to the second arm,
    wherein the trip lever is configured to rotate about the pin, and
    wherein the second frame is configured to rotate about the pin.

11. The tool head of claim 1, wherein the trip lever is perpendicular to the first arm and the second arm when the trip lever is in the closed-lever position.

* * * * *